Oct. 3, 1939.  T. F. RAINSFORD  2,174,835
AUTOMATIC VARIABLE SPEED POWER TRANSMISSION MECHANISM
Filed Aug. 14, 1937  2 Sheets-Sheet 2

INVENTOR.
THOMAS F. RAINSFORD
BY
John H. Leonard
ATTORNEY.

Patented Oct. 3, 1939

2,174,835

UNITED STATES PATENT OFFICE 2,174,835

AUTOMATIC VARIABLE SPEED POWER TRANSMISSION MECHANISM

Thomas F. Rainsford, Cleveland, Ohio, assignor, by mesne assignments, to Brotherhood of Locomotive Engineers Building Association Application August 14, 1937, Serial No. 159,125

10 Claims. (Cl. 74—260)

This invention relates to an automatic variable speed power transmission mechanism and particularly to an automatic control for varying the relative speeds of a drive shaft and a driven shaft and constitutes an improvement on the transmission mechanism described and claimed in United States Letters Patent No. 2,022,689, issued to me on December 3, 1935.

One of the principal objects of the present invention is to effect automatic interposition of the reduction gears of the transmission between the drive shaft and driven shaft consequent upon sudden acceleration of the drive shaft or the engine, and to effect automatically a restoration of direct connection or other desired connection between the drive and driven shafts upon increased speed of the driven shaft or upon continued or normal acceleration of the drive shaft or engine.

More particularly, my invention relates to a transmission for automobiles by which sudden acceleration of the engine throughout the lower one third of the speed range of the particular engine automatically effects a step down in the speed of drive of the driven shaft for preventing stalling of the engine and by which, when the engine is accelerated at a normal or gradual rate, or normal speed sufficient to carry the additional load is attained, the direct or original speed relation between the shafts is automatically restored.

A more specific object is to provide an improved shifting mechanism responsive to the combined forces of inertia, spring tension and acceleration when the mechanism is in one position for initially reducing the driving relation and responsive to centrifugal force in opposition to the spring tension and inertia for shifting its position and thereby increasing the speed relation between the drive and driven shafts.

Another object is to provide such a device which is at the same time responsive to the torque exerted by the drive shaft for effecting a stepdown in the speed relation between the drive and driven shaft.

Another specific object is to provide an epicyclic planetating gear transmission wherein braking pressure is applied automatically to the epicyclic shaft to effect a direct connection between the driving and driven shaft.

Other objects and advantages will become apparent from the following description, wherein reference is made to the drawings, in which.

Figure 1:
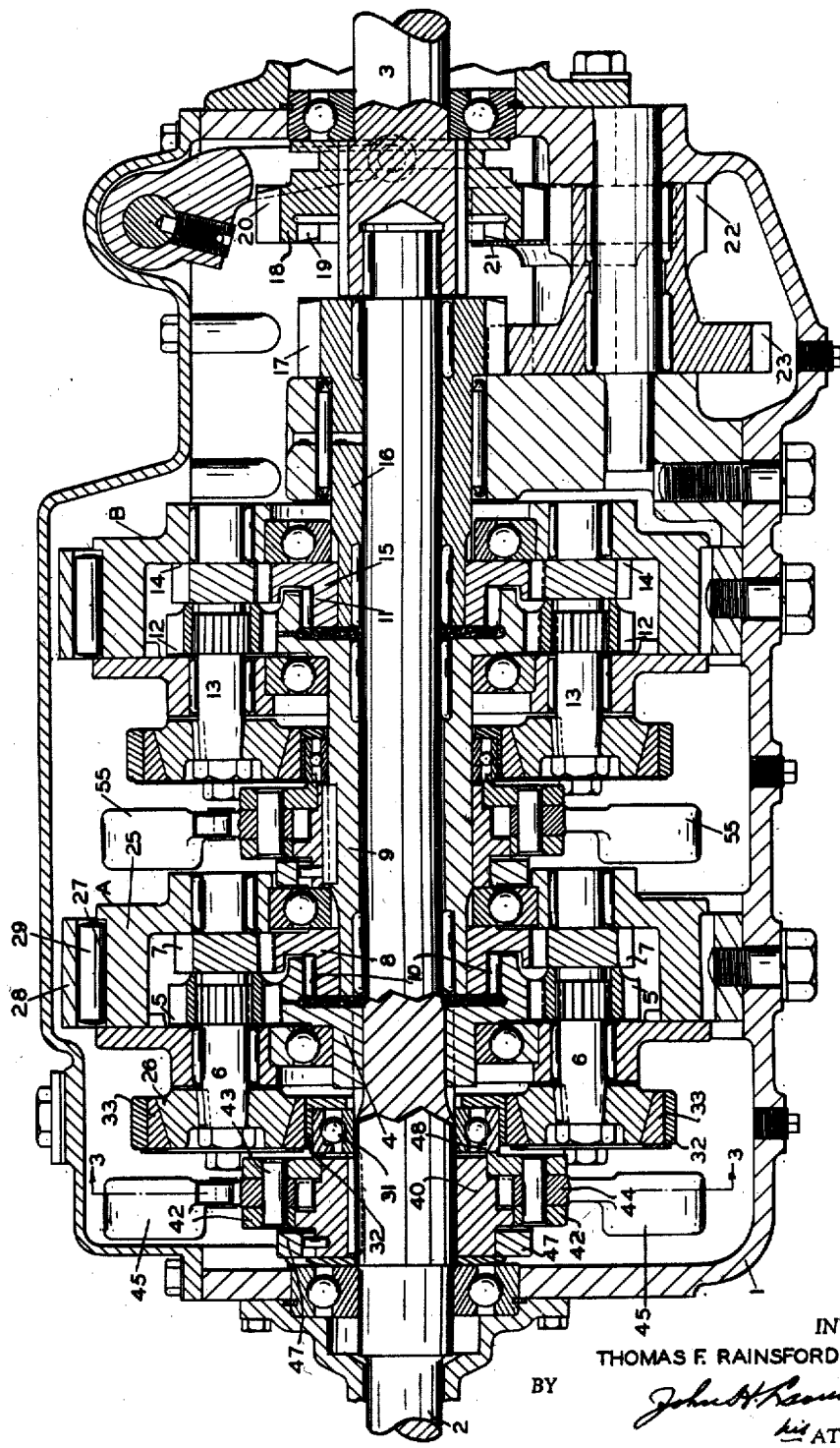
Fig. 1 is a vertical, longitudinal sectional view through a transmission mechanism and automatic reduction mechanism embodying the principles of my invention.
Figure 2:
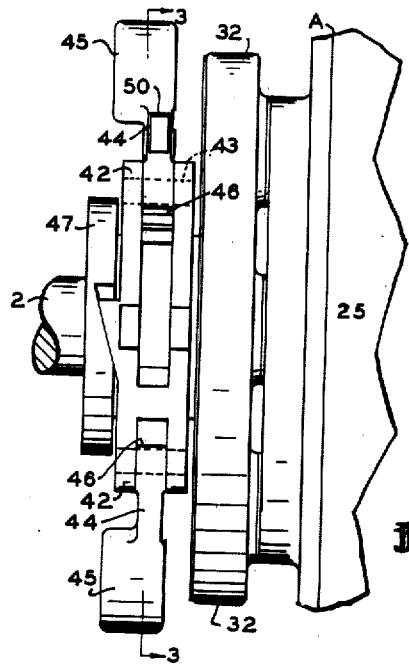
Fig. 2 is a side elevation of a portion of the transmission and the automatic gear shifting mechanism showing the position of the same for direct drive relation.
Figure 4:
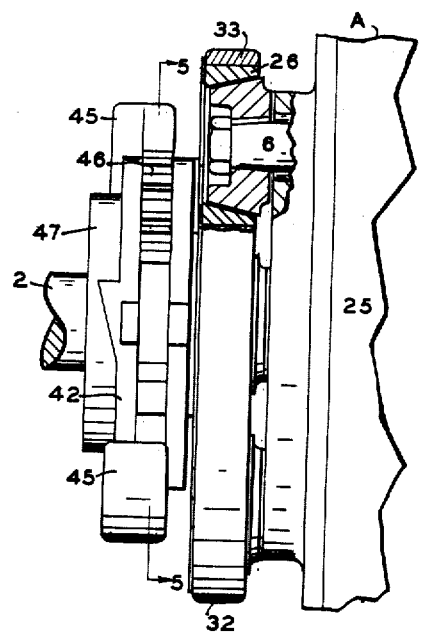
Fig. 4 is a view similar to Fig. 2, showing the mechanism in position for effecting reduction drive between the drive and driven shafts.

As more fully described in my Letters Patent above identified, the transmission itself comprises a main housing member 1, in one end of which is journaled a drive shaft 2, and in the opposite end of which is journaled a driven shaft 3, the end of the drive shaft adjacent the driven shaft being journaled therein on suitable pilot bearings, as illustrated. Between the drive shaft 2 and the driven shaft 3 are provided a plurality of compound epicyclic gear trains, two trains being shown for purposes of illustration and designated generally by the reference letters A and B. The trains A and B are arranged in series, with the train A driven directly by the drive shaft and the train B driven by the train A and, in turn, driving the driven shaft 3.

Rigidly mounted on the drive shaft 2 is the main driving gear 4 which, in turn, meshes with a plurality of planet gears 5. Each of the planet gears 5 is mounted on a suitable shaft 6, and planet gears 7 of smaller diameter are likewise provided on the shaft 6, respectively, both the gears 5 and 7 being rigid with their associated shaft 6. The planet gears 7, in turn, mesh with a main driven gear 8 which is mounted on and rigid with a rotatable sleeve 9. The sleeve 9 is mounted on and rotatable with respect to the drive shaft 2. At the end of the sleeve 9 remote from the main driven gear 8 is a driving gear 11 which is in driving relation with the planet gears 12 of the train B. The planet gears 12 are mounted on and rigid with shafts 13 on each of which is mounted a smaller planet gear 14 and the smaller planet gears are in driving relation to the gear 15. The gear 15 is rigid with a sleeve 16 rotatably mounted on the drive shaft 2 and carries at one end a combination spur gear and dental clutch element 17.

Mounted on the driven shaft 3 for axial movement relative thereto and non-rotative with respect thereto is a shiftable clutch element 18 having internal teeth arranged for connection with the internal teeth 19 of the gear 17 for effecting a direct connection between the sleeve 16 and the driven shaft 3. The clutch element 18 is also provided with external teeth 20 engageable with an idler gear 21 when the clutch element is shifted to another position and is released from the gear 17. The idler gear 21 is driven from a gear 22 rotatable and rigid with a gear 23 which, in turn, is driven by the gear 17, the reverse drive of the shaft 3 being effected through the gears 17, 23, 22, 21, and the clutch element 18. For clearness in illustration, the clutch element is shown in position for reverse drive in Fig. 1, although normally it is shifted to the left to effect a direct connection between the sleeve 16 and the driven shaft 3.

Since the gears trains A and B are similar in form and function, the gear train A only will be described in detail, the sleeve 9 being considered the driven shaft in relation to the train A. Rotatably mounted on and supported by a hub portion of the gear 4 is a housing 25 which is concentric with the drive shaft 2. The shafts 6 of the epicyclic gear train A are rotatably mounted in the housing 25 and are provided with brake members 26, each of which is preferably frustoconical and disposed with its larger base toward the planet gears 5 and 7. The brake member 26 is fixedly secured on the shaft 6 for rotation therewith. The housing 25, as illustrated, is formed in two pieces, one of which surrounds the epicyclic gear train A and is provided with an external operating surface 27.

Surrounding the circumferential surface 27 of the housing 25 is a ring 28 which is rigid with the casing 1 and interposed between the housing 27 and ring 28 is a locking roll 29. The ring 28 is grooved in a manner such that in one direction of rotation of the housing 25, the housing is released by the roller 29 and is free to rotate, whereas upon slight movement in the opposite direction, it is wedged into locked engagement with the ring 28 by the roll 29, all as more fully described in my United States Letters Patent above identified.

The roll locking of the housing 25 is such that in the direction of rotation of the drive shaft 2, the housing is free to rotate, but is constrained from rotation in the opposite direction after it has moved a slight distance in said opposite direction. It is apparent that when the drive is effected from the shaft 2 to the gears 4, 5, 7 and 8, the reactionary thrust of the gears 5 and 7 tends to rotate the housing 25 opposite from the direction of rotation of the drive shaft 2, thus substantially instantaneously causing locking of the housing by the roll 29. Thereafter the power is transmitted through the epicyclic gear train in a reduction drive relation to the gear 8 and consequently to the sleeve 9. Further, it is apparent that if the shaft 6 is restrained from rotation about its own axis, that is, from rotation relative to the housing 25 as distinguished from the rotation about its axis when it rotates bodily with the housing 25 about the axis of the drive shaft 2, that the driving relation between the gears 4, 5, 7 and 8 is arrested and thereafter the gears act as a rigid clutch connection between the gear 4 and the gear 8, thus effecting a direct drive relation between the drive shaft and the sleeve 9. Interposed between the main driven gear 8 and the main driving gear 4 in train A and between driving gear 11 and driven gear 15 of train B, locking rollers 10 are provided for the purpose of restraining rotation of the gears in one direction and avoiding free wheeling action of the shaft 3. The main driven gears 8 and 15 are grooved in such a manner that in one direction of rotation of the driving gear 4 it is released by the rollers 10 and is free to rotate, whereas upon slight movement in the opposite direction it is wedged into locked engagement with the main driving gear 4 by the rollers 10. However, interposition of the rollers 10 is not absolutely necessary for successful operation of my invention. Thus the direct drive relation or reduced drive relation through the gears may be effected by controlling the rotation of the shaft 6 about its own axis. For controlling the rotation of the shafts 6, and consequently the driving relation, the shaft 6 is provided with the brake members 26 which is preferably frustoconical in form and rigidly mounted on the shaft 6 with its larger base toward the gears 5 and 7, as heretofore described.

Mounted within the housing 1 and preferably on suitable bearings 31 on the driving shaft is a spider 32, the spider being rotatable relative to the driving shaft. Carried by this spider are complementary brake drums 33 which are preferably lined with fibre and define a surface which is frusto-conical and complementary to the surface of the brake members 26. The spider 32 is arranged for limited axial floating movement relative to the drive shaft so that it may be moved to the right in Fig. 1 to apply the brake drums 33 to the brake member 26 and thus arrest rotation of the epicycle shafts 6.

In my United States Letters Patent above referred to, there was provided a centrifugally operated mechanism capable upon acceleration to apply brakes corresponding to the brake drums 33 to correspondingly arranged brake elements on the epicyclic shafts. In this prior structure, however, the brakes were applied immediately upon acceleration of the drive shaft, the application thereof being in a somewhat direct proportional relation to the angular velocity of the drive shaft. Consequently, it was found that in the lower range of engine speed, a sudden acceleration of the engine, when it was operating comparatively slowly and at a reduction drive through the gears, would immediately apply the brake and effect a direct drive relation before the engine had gained sufficient speed. As a result, stalling was not unusual, and this stalling occurred at the time when least desirable and most dangerous. It was found desirable from the operating standpoint that upon such sudden acceleration of the engine during the lower third of the range of speed of the engine there would be a momentary reduction drive relation until the engine had come up to speed, followed by an automatic change to a direct drive relation so long as the engine could maintain the speed. In order to effect this relation, the control mechanism of the present invention was provided. This control mechanism is better illustrated in Figs. 2 to 5, inclusive.

Mounted on the drive shaft 2 for rotation therewith and in fixed axial position with respect thereto is a collar 40 having at its periphery a plurality of segmental gear portions 41. Mounted on the collar 40 and normally relatively rotatable with respect thereto is a carrier 42, the collar 40 and the carrier 42 being coaxial with the drive shaft. The carrier 42 is mounted for slight axial movement with respect to the collar 40.

Pivotally mounted on the carrier 42 by pivots 43 which extend parallel to the axis of rotation of the drive shaft and are spaced therefrom, are members 44 having rigid therewith weight elements 45, the weight elements being disposed outwardly from the carrier and axis of rotation thereof. At the inner or opposite ends of the members 44 are segmental gear portions 46 which mesh with the gear portions 41 on the collar 40. It is apparent from Fig. 3 that swinging movement of the weights 45 about their respective pivots causes relative rotation between the carrier 42 and the collar 40 due to the driving relation of the gear segments.

Carried by the collar 40 and rigid therewith is a cam ring member 47, the ring member having its end adjacent the carrier in the form of a cam engageable with a cooperating cam surface on the adjacent end of the carrier 42. The cam is so arranged with relation to the carrier that upon relative rotation of the carrier 42 and the collar 40 in one direction, the cam surfaces cooperate to move the carrier to the right in Fig. 1. In the form illustrated, rotation of the carrier 42 in the direction of rotation of the drive shaft cooperates the cam surfaces to urge the carrier to the right in Fig. 1, and rotation of the carrier 42 opposite to the direction of rotation of the drive shaft relieves the wedge pressure of the cam surfaces.

A suitable interponent 48 is interposed between the carrier 42 and the spider 32 for effecting axial movement of the spider with the carrier when the carrier moves to the right and to release the spider from the carrier upon movement of the carrier to the left in Fig. 1. Consequently, upon movement of the carrier to the right, the brake drums 33 are applied to the brake members 26 for arresting rotation of the shafts 6 and effecting a direct drive relation.

Referring again to Figs. 2 to 5, it should be noted that the weight elements 45 are pivotally connected to the carrier on pivots extending parallel to the axis of rotation of the carrier and of the drive shaft and are spaced from the drive shaft. Further, it is apparent that upon sudden acceleration of the drive shaft, the reaction between the gears 41 and 42 tends to swing the weights from the position illustrated in Fig. 3 to the position illustrated in Fig. 5, this swinging action of the weights being augmented by the inertia of the weight elements themselves. This action releases the braking pressure on the epicyclic shafts 6 so that a reduced drive relation through the epicyclic gear train A is provided. Upon continued acceleration, however, the centrifugal force of the weight elements 45 is sufficient to overcome the reactionary thrust of the gears and also their original dynamic inertia and the weight elements again approach the position illustrated in Fig. 3. During this approach period, the drive is through the epicyclic gear train A, the housing of which is also rotated so that a very gradual build-up in speed to a direct drive relation speed is effected.

Figure 3:
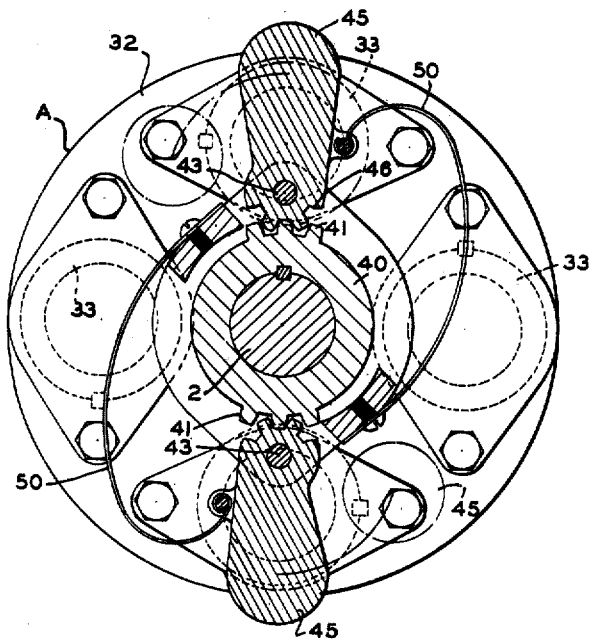
Fig. 3 is a sectional view taken on a plane indicated by the line 3—3 in Fig. 2.
Figure 5:
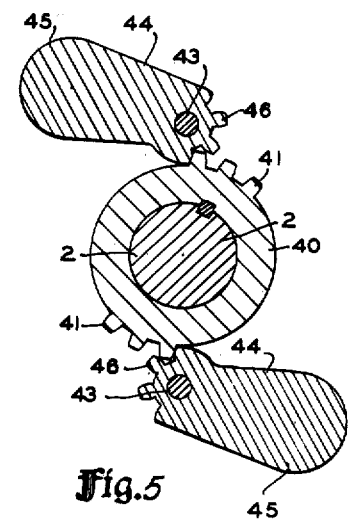
Fig. 5 is a fragmentary sectional view taken on a plane indicated by the line 5—5 of Fig. 4.

When sufficient speed of the drive shaft has been obtained at constant acceleration or without acceleration, the centrifugal force disposes the weight elements 45 to a position illustrated in Fig. 3, wherein the carrier has been advanced in the direction of rotation of the drive shaft and consequently has applied the brakes, forming a direct drive relation between the drive shaft 2 and the sleeve 9. Obviously, at high speeds above the lower third of the range of speed of the engine, the centrifugal force is at all times sufficient so that even sudden acceleration will not cause a reduced drive relation, but above the lower third of the range of engine speed, the engine has sufficient power and inertia so that upon sudden acceleration there is no danger of its choking and stopping. At comparatively low speeds, the weight elements 45 maintain the direct drive relation except for the reduction provided by sudden acceleration. Springs 50 are connected to the carrier 42 and to the weight elements 45 and normally urge the weight elements to the position illustrated in Fig. 5, so that at all extremely low speeds the centrifugal force is not sufficient to effect the direct drive relation, but the drive remains continuously through the epicyclic gear train A in a reduction drive relation. Upon final stopping of the engine, the spring 50 holds the weight elements 45 in the position illustrated in Fig. 5 so that if the drive shaft should stop rotation with the weights disposed vertically, as in Fig. 3, the lower weight element will not fall by gravity to its extended position and thus form a direct drive connection under which the engine could not start the vehicle.

In operation, once the car is in motion, the gears are automatically shifted by the weight elements 45 without application or release of the engine from the drive shaft. In the form illustrated, in which the two gear trains A and B are of the same size, three speeds forward are provided, one being a direct connection through the shaft 2, the sleeve 9, the sleeve 16 and the clutch 18 and shaft 3. One reduction is effected by a direct drive through the train A and a reduction drive through the train B or by a reduction drive through train A and direct drive through train B. The lowest speed is effected by a reduction drive through the train A plus a reduction drive through the train B. Obviously by choosing the desired number of trains of the same or different sizes, connected in series, any number of reduction or overdrive speed changes may be obtained. The weight elements 55 of the shifting mechanism of the train B, which mechanism is the same as that of the train A, may be proportioned or operated so that the shifting mechanism of the train B is effective only at a more rapid acceleration than the mechanism controlling train A so that the trains operate successively and in series rather than together. The suddenness of change from one speed to another may be controlled by a change in the size of the weight elements, a change in the distance at which they are disposed from the rotational and pivotal axes, the diameter of the gear segments 41 and 42, a change in the power of the springs 50, and a change in the angle of intersection of the brake shoes, and the clearance provided between the operating parts.

In specifying driving and driven shafts herein and particularly in the claims, it is to be understood that when a number of epicyclic gear trains, provided with individual brakes, are arranged in series between the driving and driven shaft, the driving element of the second epicyclic gear train may be considered the driven shaft in relation to a preceding gear train of the series.

Having thus described my invention, I claim:

1. In an automatic reduction gear mechanism, the combination with a drive shaft, a coaxial driven shaft, gears carried by the shafts respectively, an epicyclic shaft, gears rigid therewith and drivingly connecting the first named gears, said epicyclic shaft being rotatable bodily about the axis of the first gears, and a brake operable to arrest the reduction drive rotation of the epicyclic shaft about its axis, of brake operating means operatively drivingly connected to the drive shaft for rotation thereby and including a brake actuator which extends substantially radially of the axis of rotation of said means in brake operating position and non-radially, in brake releasing position and become operative upon initial sudden angular acceleration for releasing the brake and operative upon continued rotation for applying the brake if the same is in non-released condition.

2. In an automatic reduction gear mechanism, the combination with a drive shaft, a coaxial driven shaft, gears carried by the shafts respectively, an epicyclic shaft, gears rigid therewith and drivingly connecting the first named gears, said epicyclic shaft being rotatable bodily about the axis of the first gears and a brake operable to arrest the reduction drive rotation of the epicyclic shaft about its axis, of brake operating means including a carrier operatively drivingly connected to the drive shaft for rotation thereby and a brake operating member movably mounted on the carrier in a manner to become operated by inertia of the member in a direction circumferentially of the carrier axis upon initial sudden angular acceleration of said carrier for releasing the brake and operative upon normal acceleration of said carrier to apply the brake.

3. In an automatic reduction gear mechanism including a drive shaft, a driven shaft, gears carried by the shafts respectively, an epicyclic shaft, gears rigid therewith and drivingly connecting the first named gears, said epicyclic shaft being rotatable bodily about the axis of the first gears, and a brake operable when applied to arrest the reduction drive rotation of the epicyclic shaft about its axis, a weight rotatable about a predetermined fixed axis and drivingly connected to the drive shaft for rotation thereby about said fixed axis, means mounting the weight for limited floating movement circumferentially relative to and in a plane normal to said fixed axis, means operated by the weight consequent upon said floating movement thereof to a predetermined position for applying the brake, and operated by the weight by movement of the weight to another position in response to sudden angular acceleration of said weight for releasing the brake.

4. In an automatic reduction gear mechanism including a drive shaft, a driven shaft, gears carried by the shafts respectively, an epicyclic shaft parallel to the drive shaft, gears rigid therewith and drivingly connecting the first named gears, a brake member on the epicyclic shaft, a cooperating brake member movable parallel to the axes of the epicyclic shaft for engagement with the brake member thereon for arresting the reduction drive rotation of the epicyclic shaft, means for applying said cooperating brake member and comprising a weight, means supporting the weight for rotation about a predetermined axis and for concurrent movement radially and in opposite directions tangentially during rotation, means to rotate the weight about said axis by force applied from the driving shaft to the weight in spaced relation to the axis of rotation of the weight and to the center of gravity of the weight, and mechanism operated by the weight to actuate said cooperating brake member.

5. In an automatic reduction gear mechanism including a drive shaft, a driven shaft, gears carried by the shafts respectively, an epicyclic shaft parallel to the drive shaft, gears rigid therewith and drivingly connecting the first named gears, a brake member on the epicyclic shaft, a cooperating brake member movable axially of the epicyclic shaft for engagement with the brake member thereon for arresting the reduction drive rotation of the epicyclic shaft, means for applying said cooperating brake member and comprising a weight, a carrier therefor coaxial with and rotatable relative to the drive shaft, and movable axially of the drive shaft, means pivotally connecting the weight to the carrier in spaced relation to the axis of the drive shaft, said pivotal axis extending parallel to the drive shaft, a gear rotatably driven by said weight consequent upon pivotal movement of the weight, a cooperating gear rigid with and concentric with the drive shaft whereby movement of the weight about its pivotal axis effects limited relative rotation of the carrier and drive shaft, cam means operative by the carrier consequent upon rotation of the carrier relative to the drive shaft for effecting axial movement of the carrier, and means operatively connecting said cooperating brake member and carrier for concurrent axial movement.

6. In an automatic reduction gear mechanism including a drive shaft, a driven shaft, gears carried by the shafts respectively, an epicyclic shaft parallel to the drive shaft, gears rigid therewith and drivingly connecting the first named gears, a brake member on the epicyclic shaft, a cooperating brake member movable axially of the epicyclic shaft for engagement with the brake member thereon for arresting the reduction drive rotation of the epicyclic shaft, means for applying said cooperating brake member and comprising a weight, a carrier therefor coaxial with and rotatable about the drive shaft and movable axially thereof, means pivotally connecting the weight to the carrier in spaced relation to the axis of the drive shaft, said pivotal axis extending parallel to the drive shaft, a gear rotatable by said weight consequent upon pivotal movement of the weight, a cooperating gear on and rigid and concentric with the drive shaft, whereby movement of the weight about its pivotal axis effects relative rotation of the carrier and drive shaft, means operated by rotation of the carrier relative to the drive shaft for applying the brake when the weight recedes from the axis of the drive shaft and for releasing the brake when the weight approaches the axis of the drive shaft.

7. In an automatic reduction gear mechanism including a drive shaft, a driven shaft, gears carried by the shafts respectively, an epicyclic shaft parallel to the drive shaft, gears rigid therewith and drivingly connecting the first named gears, a brake member on the epicyclic shaft, a cooperating brake member movable axially of the epicyclic shaft for engagement with the brake member thereon for arresting the reduction drive rotation of the epicyclic shaft, means for applying said cooperating brake member and comprising a weight, a carrier therefor mounted on and coaxial with the drive shaft and rotatable about the drive shaft, a pivot connecting the weight to the carrier in spaced relation to the axis of the drive shaft and for movement outwardly from the carrier, said pivot extending parallel to the drive shaft and said carrier being movable axially relative to the drive shaft, a gear segment rigid with said weight and disposed inwardly toward the drive shaft from the pivot and rotatable about the pivot as an axis consequent upon pivotal movement of the weight, cam means rigid with the drive shaft, a cooperating cam on the carrier for movement of the carrier axially upon rotation of the carrier relative to the drive shaft, and a brake applied by the carrier upon movement of the carrier in the direction in which it is moved when the weight recedes from the axis of the drive shaft, and released by the carrier when the weight approaches the axis of the drive shaft.

8. In an automatic reduction gear mechanism, the combination with a drive shaft, a coaxial driven shaft, gears carried by the shafts respectively, an epicyclic shaft, a housing supporting the epicyclic shaft for rotation about its own axis, gears rigid with the epicyclic shaft and drivingly connecting the first named gears, said housing being rotatable about the axis of the drive shaft, means operative automatically to arrest rotation of the housing about the axis of the drive shaft in a direction opposite to the direction of driving rotation of the drive shaft and to permit rotation of the housing in the same direction as the drive shaft, a brake operable to arrest the reduction drive rotation of the epicyclic shaft about its axis, means operatively connected to the drive shaft for rotation thereby, the connection enabling circumferential floating movement of said means independently of the angular motion of the drive shaft and responsive to sudden angular acceleration for releasing the brake, and responsive to normal acceleration to apply the brake.

9. In an automatic reduction gear mechanism, the combination with a drive shaft, a coaxial driven shaft, gears carried by the shafts respectively, an epicyclic shaft and gears rigid therewith and drivingly connecting the first named gears, said epicyclic shaft being rotatable bodily about the axis of the drive shaft, and a brake operable to arrest the reduction drive rotation of the epicyclic shaft about its axis, of means operatively drivingly connected to the drive shaft for rotation thereby and mounted for circumferential floating movement about the axis of such rotation for operation upon sudden angular acceleration in the lower one-third of the driving range of velocity of the driving shaft for releasing the brake, and for operation upon further rotation and also upon acceleration above said range for applying the brake.

10. A gearing having a driving member coupled with an epicyclic gear train for transmitting power to a driven member, and braking means to prevent rotation of one of the gears of the train relative to others so that the members of the train rotate as a mass, characterized by the provision of centrifugally actuated control means for the braking means, which control means has an actuating weight pivotally mounted for movement solely in a plane normal to the axis of the driving member, and which control means operates, upon sudden acceleration of the driving member to release the braking means, if not released at the time of such acceleration, and, upon a predetermined continued acceleration, to apply it.

THOMAS F. RAINSFORD.

---

CERTIFICATE OF CORRECTION.

Patent No. 2,174,835. October 3, 1939.

THOMAS F. RAINSFORD.

It is hereby certified that error appears in the printed specification of the above numbered patent requiring correction as follows: Page 4, first column, lines 10 and 11, claim 1, strike out the words "if the same is in non-released condition" and insert the same after "brake" in line 9, same claim; line 57, claim 4, for "axes" read axis; and that the said Letters Patent should be read with this correction therein that the same may conform to the record of the case in the Patent Office.

Signed and sealed this 21st day of November, A. D. 1939.

Henry Van Arsdale,
Acting Commissioner of Patents.

(Seal)

carrier for movement of the carrier axially upon rotation of the carrier relative to the drive shaft, and a brake applied by the carrier upon movement of the carrier in the direction in which it is moved when the weight recedes from the axis of the drive shaft, and released by the carrier when the weight approaches the axis of the drive shaft.

8. In an automatic reduction gear mechanism, the combination with a drive shaft, a coaxial driven shaft, gears carried by the shafts respectively, an epicyclic shaft, a housing supporting the epicyclic shaft for rotation about its own axis, gears rigid with the epicyclic shaft and drivingly connecting the first named gears, said housing being rotatable about the axis of the drive shaft, means operative automatically to arrest rotation of the housing about the axis of the drive shaft in a direction opposite to the direction of driving rotation of the drive shaft and to permit rotation of the housing in the same direction as the drive shaft, a brake operable to arrest the reduction drive rotation of the epicyclic shaft about its axis, means operatively connected to the drive shaft for rotation thereby, the connection enabling circumferential floating movement of said means independently of the angular motion of the drive shaft and responsive to sudden angular acceleration for releasing the brake, and responsive to normal acceleration to apply the brake.

9. In an automatic reduction gear mechanism, the combination with a drive shaft, a coaxial driven shaft, gears carried by the shafts respectively, an epicyclic shaft and gears rigid therewith and drivingly connecting the first named gears, said epicyclic shaft being rotatable bodily about the axis of the drive shaft, and a brake operable to arrest the reduction drive rotation of the epicyclic shaft about its axis, of means operatively drivingly connected to the drive shaft for rotation thereby and mounted for circumferential floating movement about the axis of such rotation for operation upon sudden angular acceleration in the lower one-third of the driving range of velocity of the driving shaft for releasing the brake, and for operation upon further rotation and also upon acceleration above said range for applying the brake.

10. A gearing having a driving member coupled with an epicyclic gear train for transmitting power to a driven member, and braking means to prevent rotation of one of the gears of the train relative to others so that the members of the train rotate as a mass, characterized by the provision of centrifugally actuated control means for the braking means, which control means has an actuating weight pivotally mounted for movement solely in a plane normal to the axis of the driving member, and which control means operates, upon sudden acceleration of the driving member to release the braking means, if not released at the time of such acceleration, and, upon a predetermined continued acceleration, to apply it.

THOMAS F. RAINSFORD.

---

CERTIFICATE OF CORRECTION.

Patent No. 2,174,835. October 3, 1939.

THOMAS F. RAINSFORD.

It is hereby certified that error appears in the printed specification of the above numbered patent requiring correction as follows: Page 4, first column, lines 10 and 11, claim 1, strike out the words "if the same is in non-released condition" and insert the same after "brake" in line 9, same claim; line 57, claim 4, for "axes" read axis; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.